US 8,895,173 B2

(12) United States Patent
Gandhi et al.

(10) Patent No.: US 8,895,173 B2
(45) Date of Patent: Nov. 25, 2014

(54) BATTERY MODULE FOR AN ELECTRIC VEHICLE, AND METHOD OF ASSEMBLY THEREOF

(71) Applicant: GM Global Technology Operations LLC, Detroit, MI (US)

(72) Inventors: Milind S Gandhi, Shelby Township, MI (US); Andres V. Mituta, Rochester Hills, MI (US); Michael A. Celotto, Fenton, MI (US); Keith Badgley, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 98 days.

(21) Appl. No.: 13/724,268

(22) Filed: Dec. 21, 2012

(65) Prior Publication Data

US 2014/0178736 A1    Jun. 26, 2014

(51) Int. Cl.
*H01M 10/50* (2006.01)
*H01M 10/625* (2014.01)
*B23P 11/00* (2006.01)
*H01M 10/613* (2014.01)

(52) U.S. Cl.
CPC ...... *H01M 10/5016* (2013.01); *H01M 10/5004* (2013.01); *B23P 11/00* (2013.01)
USPC .................................................. 429/120

(58) Field of Classification Search
CPC .............. H01M 10/5004; H01M 10/5016; H01M 10/5032; H01M 2/1077
USPC .................................................. 429/120
See application file for complete search history.

(56) References Cited

U.S. PATENT DOCUMENTS

| 7,851,080 | B2 | | 12/2010 | Weber et al. |
| 8,460,815 | B2 | * | 6/2013 | Oury et al. ................... 429/120 |
| 8,465,863 | B2 | * | 6/2013 | Weber et al. ................. 429/120 |
| 2006/0048984 | A1 | * | 3/2006 | Pleune et al. ................ 180/68.4 |
| 2009/0255109 | A1 | * | 10/2009 | Weber et al. ................. 29/623.2 |
| 2009/0258288 | A1 | * | 10/2009 | Weber et al. ................. 429/120 |
| 2010/0306995 | A1 | * | 12/2010 | Scheuerman et al. ....... 29/623.1 |
| 2011/0070474 | A1 | * | 3/2011 | Lee et al. ..................... 429/120 |
| 2011/0162820 | A1 | * | 7/2011 | Weber et al. ............ 165/104.19 |
| 2011/0293982 | A1 | | 12/2011 | Martz et al. |

(Continued)

OTHER PUBLICATIONS

Disclosed Anonymously; "Water Cooled 12V Accessory Power Module Integrated with Water Cooled High Voltage Energy Storage System on Electrified Vehicle"; Research Disclosure database No. 578005; Published Jun. 2012.

*Primary Examiner* — Stewart Fraser
(74) *Attorney, Agent, or Firm* — Quinn Law Group, PLLC

(57) ABSTRACT

A battery module for an electric vehicle includes an auxiliary power module (APM) and at least one battery pack assembly. The battery pack assembly includes a plurality of battery frames, each with at least one battery cell disposed within it, and a plurality of cooling plates, each in thermal communication with at least one battery cell. The cooling plates have an inlet and an outlet connected by at least one coolant channel through which coolant is circulated to cool the battery cells. The APM may also require cooling, in which case the battery module may further include at least one additional cooling plate in thermal communication with the APM. The APM and the battery pack assembly are held together under compression such that they may share a common cooling system, and coolant may flow through the APM and/or the battery pack assembly to the cooling plates.

20 Claims, 4 Drawing Sheets

(56) References Cited

U.S. PATENT DOCUMENTS

| | | | |
|---|---|---|---|
| 2011/0293983 A1* | 12/2011 | Oury et al. | 429/120 |
| 2012/0028098 A1 | 2/2012 | Meehan et al. | |
| 2013/0004806 A1* | 1/2013 | Wang | 429/50 |

\* cited by examiner

BATTERY MODULE FOR AN ELECTRIC VEHICLE, AND METHOD OF ASSEMBLY THEREOF

TECHNICAL FIELD

The present invention relates to a battery module, with an auxiliary power module (APM) integrated with a battery pack assembly, for an electric vehicle, as well as a method of assembling the battery module thereof.

BACKGROUND

Electric vehicles, including, but not limited to, hybrid vehicles, employ a high voltage electric battery system that includes a number of battery cells. An electric vehicle typically requires several battery cells to provide enough power to meet vehicle power and energy requirements. The battery cells are generally grouped into packs, and a plurality of battery packs form an energy storage system (ESS), which may be rechargeable. The ESS is often located under the vehicle body midway between the front and rear wheels.

Electric vehicles also often include a low voltage battery, such as a 12-volt battery, that powers one or more auxiliary systems, including, but not limited to, headlights, windshield wipers, power door locks, power seats, an audio system, and other electronic components. The low voltage battery may be recharged by the ESS via an auxiliary power module (APM), which may be electrically connected to the low voltage battery. The APM is a DC-DC power converter that converts power from the high voltage of the ESS to the low voltage required by the low voltage battery. The APM is often located in the trunk or other storage compartment of the vehicle.

Both the ESS and the APM may generate thermal energy during operation, and as such, may require cooling in order to maximize the charging capacity and life of the batteries. Additionally, external temperatures near the ESS and the APM due to their respective locations may further affect operating efficiency. Cooling systems, which may include circulation of a coolant through cooling plates, have been developed to provide cooling for individual battery cells in the ESS and to the external sides of the APM. These cooling systems may require tubing and additional devices to provide the desired temperature control.

SUMMARY

A battery module for an electric vehicle is provided. The battery module includes an auxiliary power module (APM) and at least one battery pack assembly that are held together under compression. This may be accomplished by at least one tie rod. The integration of the APM with at least one battery pack assembly into a single battery module allows the APM to be built into an existing module stacker, thereby simplifying assembly and reducing the quantity of required parts. This may result in a reduction in overall manufacturing costs, including parts and labor, of the electric vehicle.

The at least one battery pack assembly includes a plurality of battery frames arranged in a stack, and a plurality of battery cells, each of which is disposed within one of the battery frames. The at least one battery pack assembly further includes a plurality of cooling plates, each of which is in thermal communication with at least one of the battery cells. Each cooling plate has an inlet and an outlet that are connected by at least one cooling channel through which coolant is circulated to cool the battery cells. The coolant is distributed to the cooling plates by a liquid cooling system.

In addition to the battery cells, the APM may also require cooling. As such, the battery module may include at least one additional cooling plate that is in thermal communication with the APM. The APM may be housed in a casing, in which case the at least one additional cooling plate will be in thermal communication with a surface of the APM casing. As with the cooling plates for the battery cells, the at least one cooling plate for the APM also has an inlet and an outlet that are connected by at least one coolant channel through which coolant is circulated. The at least one cooling plate will also receive the coolant from the same liquid cooling system as the plurality of cooling plates for the battery cells. The sharing of the liquid cooling system may eliminate the need for a separate cooling system for the APM.

To provide a common distribution of coolant from the liquid cooling system to the cooling plates for both the APM and the battery cells, the APM (or the APM casing), each of the battery frames, and each of the cooling plates may have a pair of manifold apertures. The pairs of manifold apertures line up and cooperate with each other to define a supply manifold and a return manifold. Coolant is supplied to the inlet of each cooling plate through the supply manifold, and discharges from the outlet of each cooling plate into the return manifold where it may be recirculated back to the supply manifold.

An electric vehicle is also provided. The electric vehicle includes a vehicle chassis, a battery module, which may be as described above, and a liquid cooling system for distributing coolant to the cooling plates. The electric vehicle may also include a battery module tray to which the battery module is secured, and which is affixed to the vehicle chassis. The electric vehicle may also include a battery module cover that extends around the battery module, and that is secured to the battery module tray. The electric vehicle may further include a battery disconnect unit (BDU) that is in electrical communication with the battery module.

A method for assembling a battery module for an electric vehicle is also provided. The battery module may be as described above. The method includes first stacking a plurality of battery frames, each having at least one battery cell within it, and a plurality of cooling plates in an alternating arrangement such that each cooling plate is in thermal communication with at least one battery cell, to form a battery pack assembly. The battery frames and the cooling plates are stacked on a module stacker that may include at least one tie rod.

The method then includes stacking the APM together with the battery pack assembly such that they are held under compression. This may be accomplished by the at least one tie rod, and allows coolant to be able to flow through at least one of the APM and the battery pack assembly to each of the cooling plates. Where the APM requires cooling, the method may further include stacking at least one additional cooling plate on the module stacker such that it is in thermal communication with the APM.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Figure 1:
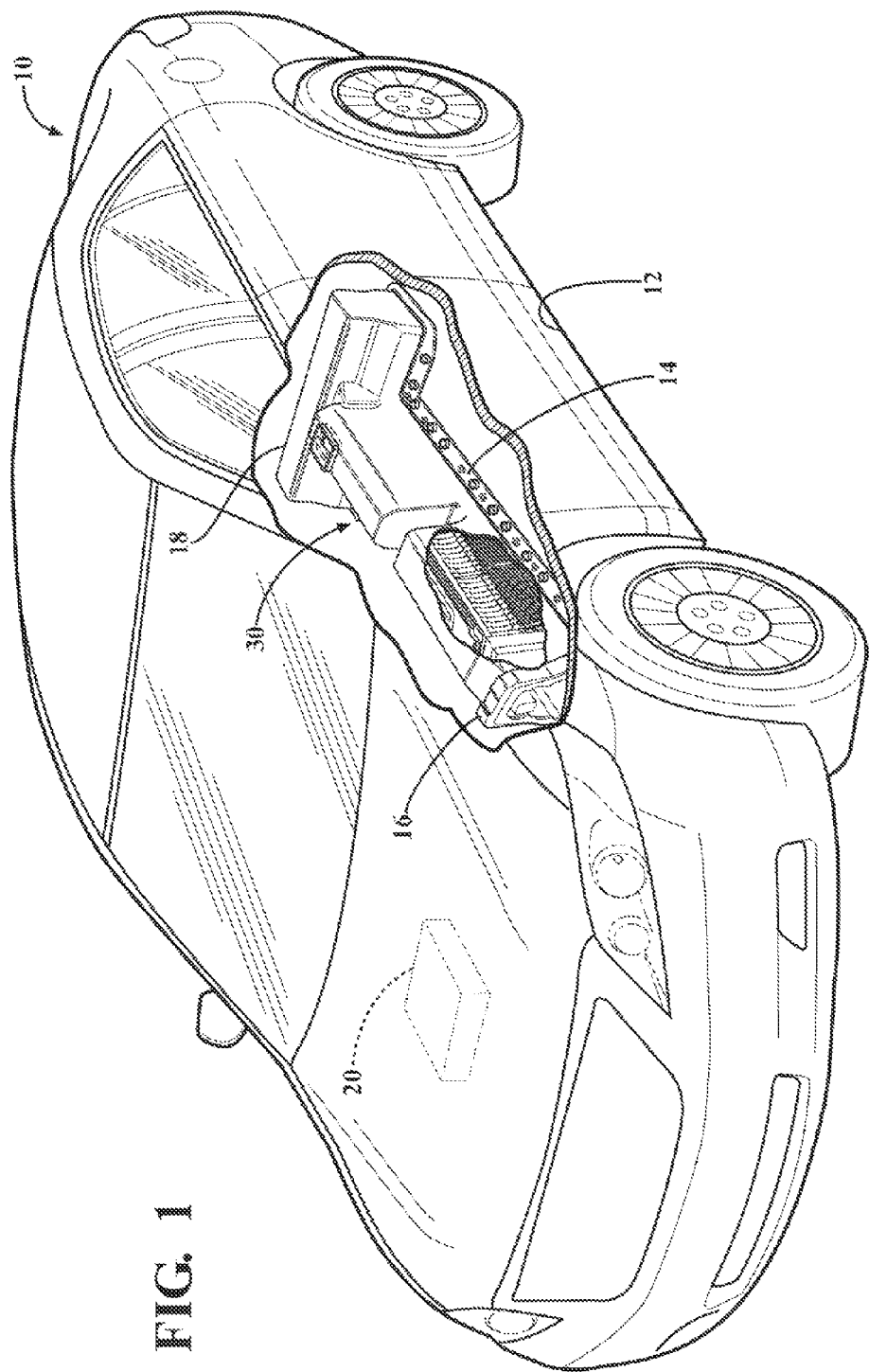
FIG. 1 is a schematic, perspective view of an electric vehicle with a cut-away section to reveal a battery module having a battery pack assembly and an integrated auxiliary power module (APM)

Referring to the drawings, wherein like reference numbers correspond to like or similar components wherever possible throughout the several figures, an electric vehicle 10 having a battery module 30, with a high voltage battery pack assembly 50 and an integrated auxiliary power module (APM) 40, is shown in FIG. 1. The electric vehicle 10 includes a vehicle chassis 12 and a battery module tray 14. The battery module 30 attaches to the battery module tray 14, which in turn, attaches to the vehicle chassis 12 to secure the battery module 30 to the electric vehicle 10. The electric vehicle 10 further includes a liquid cooling system 20 to distribute coolant to the battery module 30, specifically to cooling plates 64 in thermal communication with the APM 40 and/or the battery pack assembly 50, as depicted in FIG. 2 and described hereinafter.

The electric vehicle 10 may also include a battery disconnect unit (BDU) 16, which is connected to the battery module 30 and provides electrical communication between the battery module 30 and an electrical system (not shown) of the electric vehicle 10. The electric vehicle 10 may further include a battery module cover 18 that extends around the battery module 30. The battery module cover 18 may protect the battery module 30 from being damaged, as well as provide electrical insulation from the high voltage of the battery pack assembly 50.

Figure 2:
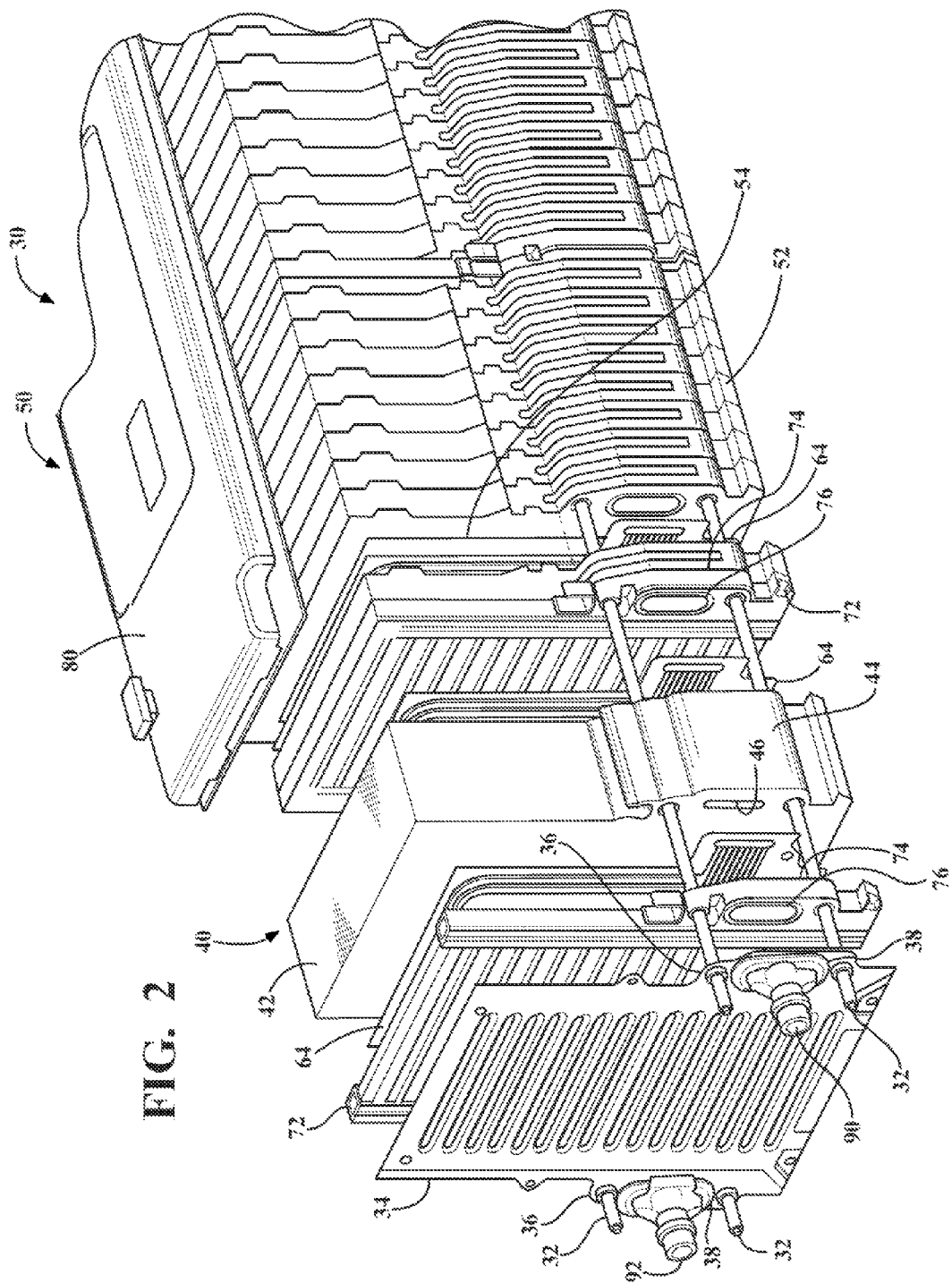
FIG. 2 is a schematic, fragmentary perspective view of the battery module of FIG. 1 in an unassembled state.

Referring to FIG. 2, a fragmentary, perspective view of the battery module 30 is shown in an unassembled state. As explained above, the battery module 30 includes an APM 40 integrated with a battery pack assembly 50. The integration of the APM 40 with the battery pack assembly 50 into a single battery module 30 allows the APM 40 to be built into an existing module stacker, thereby simplifying assembly and reducing the quantity of required parts. This may result in a reduction in overall manufacturing costs, including parts and labor, of the electric vehicle 10. While FIG. 2 depicts the APM 40 located at one end of the battery module 30, it should be appreciated that the APM 40 may be located at any end of the battery module 30. It should further be appreciated that the battery module 30 may have more than one battery pack assembly 50.

The APM 40 and the battery pack assembly 50 are held together under compression. This will allow for the coolant distributed by the liquid cooling system 20 to flow through the APM 40 and/or the battery pack assembly 50 to each of the cooling plates 64, depicted in FIG. 4 and described hereinafter. This may be accomplished by tie rods 32. While four tie rods 32 are shown in FIG. 2, it should be appreciated that any number of tie rods 32 are contemplated. Generally, there is more than one tie rod 32 to prevent any rotational movement of the components around the tie rods 32, as well as to ensure that the components line up accordingly. It should also be appreciated that any other devices or mechanisms, including, but not limited to, compression rods, compression straps, and the like, capable of holding the components together under compression may be used in lieu of the tie rods 32.

Figure 3:
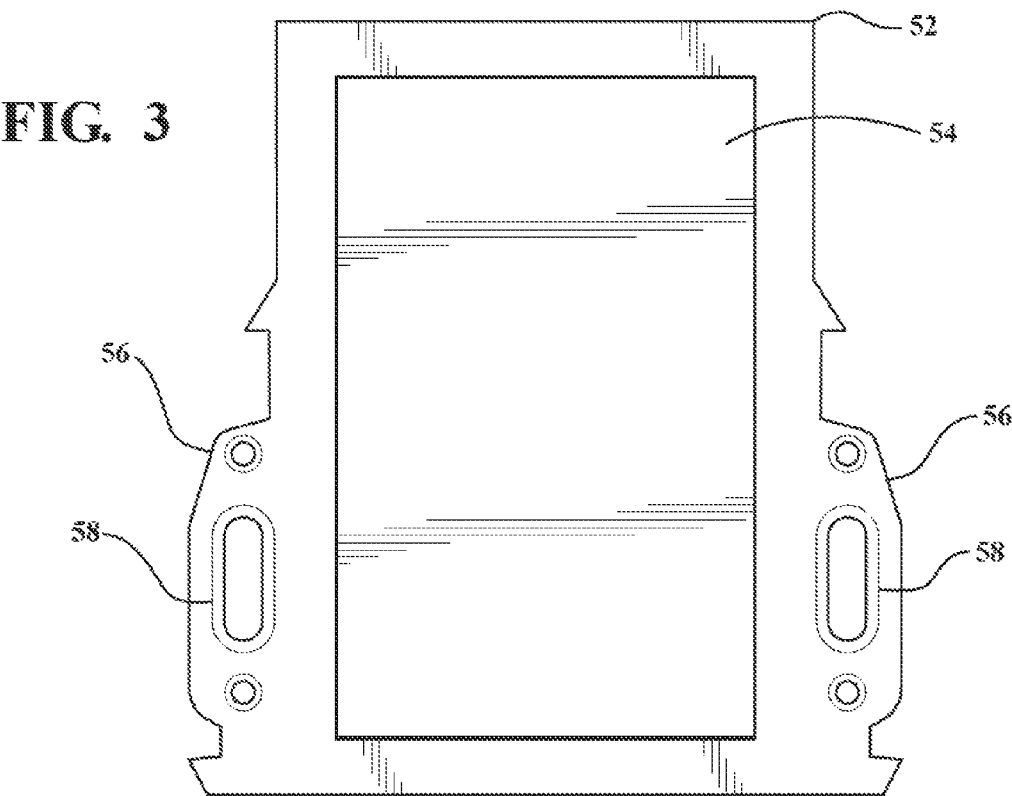
FIG. 3 is a schematic, front view of a battery frame, with a battery cell disposed within it.

The battery pack assembly 50 includes a plurality of battery frames 52, each of which has a battery cell 54 disposed within the battery frame 52, as depicted in FIG. 3. The battery cell 54 generally is high voltage, and may be, but is not limited to, a lithium ion battery cell. While FIG. 3 only shows one battery cell 54 disposed within the battery frame 52, it should be appreciated that any number of battery cells 54 may be disposed within the battery frame 52.

Figure 4:
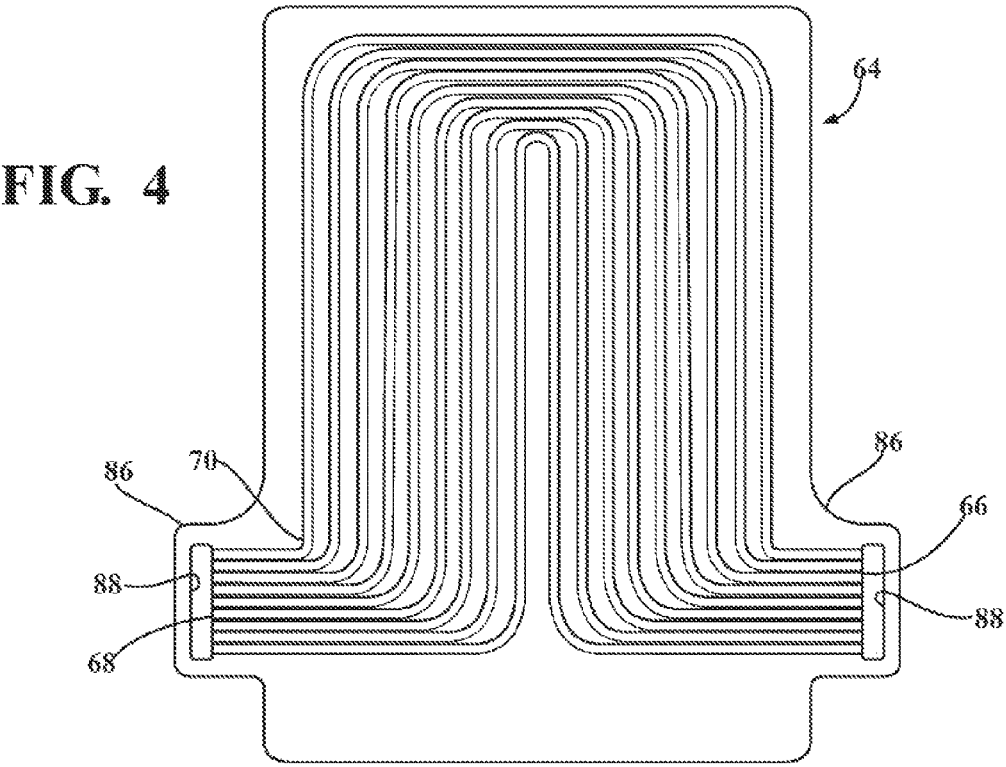
FIG. 4 is a schematic, front view of a cooling plate.

As discussed above, the battery pack assembly 50 also includes a plurality of cooling plates 64. Each cooling plate 64 is in thermal communication with at least one battery cell 54 to provide cooling for the battery cells 54, and is generally located between battery frames 52. As depicted in FIG. 4, the cooling plates 64 each have an inlet 66 and an outlet 68 that are connected by a plurality of coolant channels 70 through which coolant is circulated. It should be appreciated that the cooling plate 64 may have any number of coolant channels 70, and the coolant channels 70 may vary in size and configuration. As explained above, the cooling plates 64 receive coolant from the liquid cooling system 20.

The battery pack assembly 50 may further include an end frame 72 on at least one of the ends of the battery pack assembly 50 and a battery pack assembly cap 80. The end frame 72 may cooperate with the tie rods 32 to hold the battery frames 52 and the cooling plates 64 under compression to ensure that the cooling plates 64 are in thermal communication with the battery cells 54.

The APM 40 is a DC-DC power converter that converts power from high voltage to low voltage such that a low voltage battery (not shown) in the electric vehicle 10 may be charged by the high voltage battery pack assembly 50. The APM 40 may include a casing 42. Similar to the battery cells 54, the APM 40 generates thermal energy and as such, may require cooling. Therefore, the battery module 30 may further include additional cooling plates 64 that are in thermal communication with the APM 40. In embodiments in which the APM 40 is housed within a casing 42, the cooling plates 64 are in thermal communication with the casing 42. While FIG. 2 depicts a cooling plate 64 on both sides of the APM 40, it should be appreciated that there may be just one cooling plate 64 on either side of the APM 40 to provide the necessary cooling for the APM 40. The APM 40 and the battery pack assembly 50 may share a common cooling system, and as such, the cooling plates 64 in thermal communication with the APM 40 also receive coolant from the liquid cooling system 20.

The battery module 30 may also include an end plate 34 and an additional end frame 72. As with the battery pack assembly 50, the end frame 72 may cooperate with the tie rods 32 to hold the APM 40 and the cooling plates 64 under compression to ensure that the cooling plates 64 are in thermal communication with the APM 40. The end frame 72 and the tie rods 32 may further hold the APM 40 and the battery pack assembly 50 under compression such that the coolant may flow through the APM 40 and/or the battery pack assembly 30 to each of the cooling plates 64 without the coolant leaking.

As explained above, where both the APM 40 and the battery pack assembly 50 require cooling, they may share a common cooling system in which coolant is distributed to both the cooling plates 64 in thermal communication with the APM 40 and those in thermal communication with the battery cells 54 in the battery pack assembly 50. This may be accomplished by a supply manifold 82 and a return manifold 84, as depicted in the schematic of FIG. 5.

Figure 5:
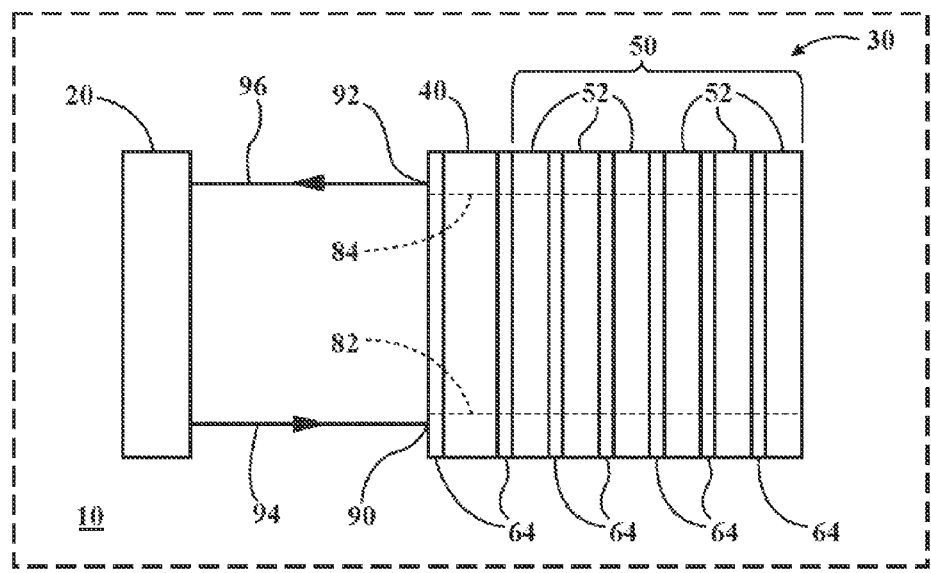
FIG. 5 is a schematic block and flow diagram of the electric vehicle of FIG. 1 illustrating the distribution of coolant to cooling plates of the battery module.

Referring to FIG. 5, the coolant is supplied by the liquid cooling system 20, as illustrated by the supply line 94, to the inlet 66 of each cooling plate 64 through the supply manifold 82. After circulating through the cooling plates 64, the coolant discharges from the outlet 68 of each cooling plate 64 into the return manifold 84, after which the liquid cooling system 20 may recirculate the coolant back to the supply manifold 82, as illustrated by the return line 96.

Referring to FIGS. 3 and 4, each battery frame 52 and each cooling plate 64 may have a pair of manifold extensions 56 and 86, respectively, that extend outwardly from opposite sides of the battery frame 52 and the cooling plate 64. Within each manifold extension 56 and 86 is a manifold aperture 58 and 88, respectively. Referring back to FIG. 2, the APM 40 (or APM casing 42), the end frames 72, and the end plate 34 may also have a pair of manifold extensions 44, 74, and 36, respectively, and manifold apertures 46, 76, and 38, respectively. The pairs of manifold apertures 46, 76, 38, 58, and 88 line up and cooperate with each other to define the supply manifold 82 and the return manifold 84. As the components are all held together under compression, the supply manifold 82 and the return manifold 84 are substantially watertight to prevent leaking of coolant. In addition, the manifold apertures 46, 76, 38, 58, and 88 may also have seals (not shown) disposed within them to further ensure that coolant does not leak from the supply manifold 82 and the return manifold 84. The end plate 34 may have an inlet connection 90 and an outlet connection 92 to which the liquid cooling system 20 may connect to supply the coolant to the supply manifold 82, and receive the coolant from the return manifold 84, respectively.

Figure 6:
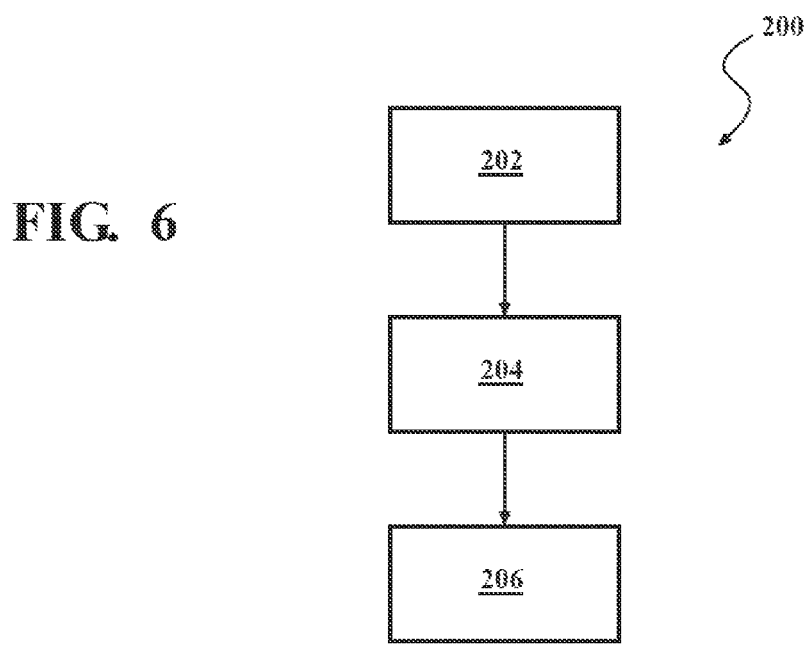
FIG. 6 is a schematic flow diagram illustrating an exemplary method of assembling the battery module of FIG. 2.

Referring now to FIG. 6, a method 200 for assembling a battery module 30, having an APM 40 integrated with a battery pack assembly 50, for an electric vehicle 10 is shown. While method 200 is described with respect to the battery module 30, it should be appreciated that method 200 may be applied to any embodiments of a battery module in accordance with the present invention.

Method 200 begins at step 202 in which a battery frame 52 is stacked on a module stacker. The module stacker may include at least one tie rod 32. Generally, there is more than one tie rod 32 to prevent any rotational movement around the tie rods 32, as well as to ensure that the components line up accordingly. As described above, the battery frame 52 has at least one battery cell 54 disposed within it.

After step 202, method 200 proceeds to step 204. At step 204, a cooling plate 64 is stacked on the module stacker on top of the battery frame 52. As described above, the cooling plate 64 has an inlet 66 and an outlet 68 connected by at least one coolant channel 70 through which coolant may be circulated.

The battery frame 52 and the cooling plate 64 are held together under compression such that they are in electrical communication with each other. This may be accomplished by the at least one tie rod 32. Steps 202 and 204 are repeated as many times as there are desired battery cells 54, as determined by the power requirements of the electric vehicle 10, to form the battery pack assembly 50.

After step 204, method 200 proceeds to step 206. At step 206, an APM 40 is stacked on the module stacker on top of the battery pack assembly 50. The APM 40 and the battery pack assembly 50 are held together under compression such that coolant may flow through the APM 40 and the battery pack assembly 50 to each of the cooling plates 64. Again, this may be accomplished by the at least one tie rod 32. It should be appreciated that step 206 may occur prior to step 202.

In embodiments in which the APM 40 requires cooling in addition to the battery cells 54, method 200 may also include stacking on the module stacker at least one additional cooling plate 64 on the module stacker such that it is in thermal communication with the APM 40.

Furthermore, in embodiments in which the battery module 30 includes at least one end frame 72 and/or an end plate 34, method 200 may also include stacking on the module stacker the end frame 72 and then the end plate 34. An end frame 72 may also be stacked prior to step 202 and/or 206 as part of the battery pack assembly 50.

Method 200 may further include securing the battery module to a battery tray 14, covering the battery module 30 with a battery module cover 18, and/or connecting a BDU 16 to the battery module 30.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A battery module for an electric vehicle having a liquid cooling system, the battery module comprising:
    an auxiliary power module (APM); and
    at least one battery pack assembly including:
        a plurality of battery frames arranged in a stack;
        a plurality of battery cells, each of which is disposed within one of the battery frames; and
        a plurality of cooling plates, each of which is in thermal communication with at least one of the plurality of battery cells, each cooling plate having an inlet and an outlet connected by at least one coolant channel through which coolant is circulated;
    wherein the coolant is distributed to the plurality of cooling plates by the liquid cooling system; and
    wherein the APM and the battery pack assembly are stacked together and held together under compression such that the coolant may flow through at least one of the APM and the battery pack assembly to each of the cooling plates.

2. The battery module of claim 1 further comprising at least one cooling plate in thermal communication with the APM, the at least one cooling plate having an inlet and an outlet connected by at least one coolant channel through which the coolant is circulated, the at least one cooling plate receiving the coolant from the liquid cooling system.

3. The battery module of claim 2 wherein the APM, each of the battery frames, and each of the cooling plates include a pair of manifold apertures, the pairs cooperating with each other to define a supply manifold, through which the coolant is supplied to the inlet of each cooling plate, and a return manifold, through which the coolant is recirculated from the outlet of each cooling plate back to the supply manifold.

4. The battery module of claim 1 further comprising an APM casing in which the APM is housed.

5. The battery module of claim 1 further comprising a battery module cover extending around the battery module.

6. The battery module of claim 1 further comprising at least one tie rod to hold the APM and the at least one battery pack assembly under compression.

7. An electric vehicle comprising:
    a vehicle chassis;
    a battery module having:

an auxiliary power module (APM); and
at least one battery pack assembly including:
- a plurality of frames arranged in a stack;
- a plurality of battery cells, each of which is disposed in one of the frames; and
- a plurality of cooling plates, each of which is in thermal communication with at least one of the plurality of battery cells, each cooling plate having an inlet and an outlet connected by at least one coolant channel through which coolant may be circulated; and
- a liquid cooling system for distributing the coolant to the plurality of cooling plates;
- wherein the APM and the battery pack assembly are stacked together and held together under compression such that the coolant may flow through at least one of the APM and the battery pack assembly to each of the cooling plates.

8. The electric vehicle of claim 7 wherein the battery module further comprises at least one cooling plate in thermal communication with the APM, the at least one cooling plate having an inlet and an outlet connected by at least one coolant channel through which the coolant is circulated, the at least one cooling plate receiving the coolant from the liquid cooling system.

9. The electric vehicle of claim 8 wherein the APM, each of the battery frames, and each of the cooling plates include a pair of manifold apertures, the pairs cooperating with each other to define a supply manifold, through which the coolant is supplied to the inlet of each cooling plate, and a return manifold, through which the coolant is recirculated from the outlet of each cooling plate back to the supply manifold.

10. The electric vehicle of claim 8 wherein the battery module further comprises an APM casing in which the APM is housed.

11. The electric vehicle of claim 8 further comprising a battery module tray to which the battery module is secured, the battery module tray being affixed to the vehicle chassis.

12. The electric vehicle of claim 8 further comprising a battery module cover extending around the battery module.

13. The electric vehicle of claim 8 further comprising at least one tie rod to hold the APM and the battery pack assembly under compression.

14. The electric vehicle of claim 8 further comprising a battery disconnect unit (BDU) in electrical communication with the battery module.

15. A method of assembling a battery module for an electric vehicle, the method comprising:
- stacking on a module stacker a plurality of battery frames, each having at least one battery cell disposed within it, and a plurality of cooling plates in an alternating arrangement such that each cooling plate is in thermal communication with at least one battery cell, to form a battery pack assembly; and
- stacking on the module stacker an auxiliary power module (APM) together with the battery pack assembly, the APM and the battery pack assembly being held under compression such that coolant may flow through at least one of the APM and the battery pack assembly to each of the cooling plates;
- wherein each cooling plate has an inlet and an outlet connected by at least one coolant channel through which the coolant is circulated.

16. The method of claim 15 wherein the module stacker comprises at least one tie rod.

17. The method of claim 16 further comprising stacking on the module stacker at least one additional cooling plate to be in thermal communication with the APM.

18. The method of claim 16 further comprising covering the battery module with a battery module cover.

19. The method of claim 16 further comprising securing the battery module to a battery tray.

20. The method of claim 16 further comprising connecting a battery disconnect unit (BDU) to the battery module.

* * * * *